US008442738B2

(12) United States Patent
Patmore

(10) Patent No.: US 8,442,738 B2
(45) Date of Patent: May 14, 2013

(54) SPEED CONTROL FOR PATIENT HANDLING DEVICE

(75) Inventor: Kevin M. Patmore, Plainwell, MI (US)

(73) Assignee: Stryker Corporation, Kalamazoo, MI (US)

(*) Notice: Subject to any disclaimer, the term of this patent is extended or adjusted under 35 U.S.C. 154(b) by 799 days.

(21) Appl. No.: 12/577,355

(22) Filed: Oct. 12, 2009

(65) Prior Publication Data
US 2011/0087416 A1 Apr. 14, 2011

(51) Int. Cl.
B60T 8/32 (2006.01)
B62D 51/00 (2006.01)

(52) U.S. Cl.
USPC ............................................ 701/93; 180/19.1

(58) Field of Classification Search .................... 701/93, 701/96, 70, 300–302; 180/170–171, 19.1–19.3; 340/435–436, 901, 903
See application file for complete search history.

(56) References Cited

U.S. PATENT DOCUMENTS

| 3,112,001 | A | 11/1963 | Wise |
| 3,286,602 | A | 11/1966 | Butner et al. |
| 3,304,116 | A | 2/1967 | Stryker |
| 3,380,546 | A | 4/1968 | Rabjohn |
| 3,404,746 | A | 10/1968 | Slay |
| 3,452,371 | A | 7/1969 | Hirsch |
| 3,580,351 | A | 5/1971 | Mollen |
| 3,802,524 | A | 4/1974 | Seidel |
| 3,807,585 | A | 4/1974 | Holzmann |
| 3,869,011 | A | 3/1975 | Jensen |
| 3,938,608 | A | 2/1976 | Folco-Zambelli |
| 4,102,424 | A | 7/1978 | Heinze |
| 4,221,273 | A | 9/1980 | Finden |
| 4,260,035 | A | 4/1981 | Loveless et al. |
| 4,280,580 | A | 7/1981 | Wojcik |

(Continued)

FOREIGN PATENT DOCUMENTS

| CA | 2010543 | 9/1991 |
| DE | 4319516 | 12/1994 |

(Continued)

OTHER PUBLICATIONS

PCT Search Report and Written Opinion from corresponding International Application No. PCT/US2010/052290 dated Jul. 1, 2011.

(Continued)

Primary Examiner — Yonel Beaulieu
(74) Attorney, Agent, or Firm — Warner Norcross & Judd LLP

(57) ABSTRACT

A patient handling device, such as a bed, stretcher, cot, or the like, includes a motor for driving one or more wheels to assist in the movement of the device. At least one proximity sensor is positioned on the device in order to detect the presence of one or more objects that may lie in the path of the device when it moves. A controller on the device determines the distance between itself and the object and automatically controls the speed of the device in a manner designed to reduce the likelihood of a collision and/or to mitigate the impact of a collision. The automatic speed control of the device may follow one or more predetermined profiles that correlate certain parameters, such as a distance to the object or relative velocity, with a maximum acceptable speed of the device.

28 Claims, 10 Drawing Sheets

U.S. PATENT DOCUMENTS

| | | | |
|---|---|---|---|
| 4,284,929 A | 8/1981 | Garrett et al. |
| 4,407,393 A | 10/1983 | Youdin et al. |
| 4,475,613 A | 10/1984 | Walker |
| 4,614,246 A | 9/1986 | Masse et al. |
| 4,646,860 A | 3/1987 | Owens et al. |
| 4,697,661 A | 10/1987 | Pajerski et al. |
| 4,768,241 A | 9/1988 | Beney |
| 4,848,504 A | 7/1989 | Olson |
| 4,874,055 A | 10/1989 | Beer |
| 4,953,243 A | 9/1990 | Birkmann |
| 5,064,012 A | 11/1991 | Losego |
| 5,083,625 A | 1/1992 | Bleicher |
| 5,113,959 A | 5/1992 | Mastov et al. |
| 5,121,806 A | 6/1992 | Johnson |
| 5,156,226 A | 10/1992 | Boyer et al. |
| 5,193,633 A | 3/1993 | Ezenwa |
| 5,222,567 A | 6/1993 | Broadhead et al. |
| 5,234,066 A | 8/1993 | Ahsing et al. |
| 5,337,845 A | 8/1994 | Foster et al. |
| 5,390,382 A | 2/1995 | Hannant et al. |
| 5,457,831 A | 10/1995 | Foster et al. |
| 5,542,690 A | 8/1996 | Kozicki |
| 5,778,996 A | 7/1998 | Prior et al. |
| 5,806,111 A | 9/1998 | Heimbrock et al. |
| 5,810,104 A | 9/1998 | Campbell |
| 5,826,670 A | 10/1998 | Nan |
| 5,896,297 A | 4/1999 | Valerino, Sr. |
| 5,927,414 A | 7/1999 | Kan et al. |
| 5,937,959 A | 8/1999 | Fujii et al. |
| 5,937,961 A | 8/1999 | Davidson |
| 5,944,131 A | 8/1999 | Schaffner et al. |
| 5,964,313 A | 10/1999 | Guy |
| 5,983,425 A | 11/1999 | DiMucci et al. |
| 6,000,076 A | 12/1999 | Webster et al. |
| 6,000,486 A | 12/1999 | Romick et al. |
| 6,050,356 A | 4/2000 | Takeda et al. |
| 6,070,679 A | 6/2000 | Berg et al. |
| 6,098,732 A | 8/2000 | Romick et al. |
| 6,154,690 A | 11/2000 | Coleman |
| 6,178,575 B1 | 1/2001 | Harada |
| 6,209,670 B1 | 4/2001 | Fernie et al. |
| 6,256,812 B1 | 7/2001 | Bartow et al. |
| 6,286,165 B1 | 9/2001 | Heimbrock et al. |
| 6,330,926 B1 | 12/2001 | Heimbrock et al. |
| 6,367,817 B1 | 4/2002 | Kamen et al. |
| 6,390,213 B1 | 5/2002 | Bleicher |
| 6,505,359 B2 | 1/2003 | Heimbrock et al. |
| 6,588,523 B2 | 7/2003 | Heimbrock et al. |
| 6,725,956 B1 | 4/2004 | Lemire |
| 6,729,421 B1 | 5/2004 | Gluck et al. |
| 6,749,034 B2 | 6/2004 | Vogel et al. |
| 6,752,224 B2 * | 6/2004 | Hopper et al. ................. 180/22 |
| 6,772,850 B1 | 8/2004 | Waters et al. |
| 6,834,402 B2 | 12/2004 | Hansen et al. |
| 6,871,714 B2 | 3/2005 | Johnson |
| 6,874,800 B2 | 4/2005 | George |
| 6,877,572 B2 | 4/2005 | Vogel et al. |
| 6,902,019 B2 | 6/2005 | Heimbrock et al. |
| 6,993,799 B2 | 2/2006 | Foster et al. |
| 7,007,765 B2 | 3/2006 | Waters et al. |
| 7,011,172 B2 | 3/2006 | Heimbrock et al. |
| 7,018,157 B2 | 3/2006 | Gallant et al. |
| 7,090,041 B2 | 8/2006 | Vogel et al. |
| 7,155,341 B2 * | 12/2006 | Kimura et al. ................. 701/301 |
| 7,191,854 B2 | 3/2007 | Lenkman |
| 7,219,754 B2 | 5/2007 | Johnson |
| 7,273,115 B2 | 9/2007 | Kummer et al. |
| 7,284,626 B2 | 10/2007 | Heimbrock et al. |
| 7,302,722 B2 | 12/2007 | Karmer, Jr. et al. |
| 7,311,161 B2 | 12/2007 | Lee |
| 7,395,564 B2 | 7/2008 | McDaniel et al. |
| 7,398,517 B2 | 7/2008 | Souke et al. |
| 7,407,024 B2 | 8/2008 | Vogel et al. |
| 7,419,019 B1 | 9/2008 | White et al. |
| 7,472,437 B2 | 1/2009 | Riley et al. |
| 7,472,438 B2 | 1/2009 | Karmer, Jr. et al. |
| 7,533,892 B2 | 5/2009 | Schena et al. |
| 7,644,458 B2 | 1/2010 | Foster et al. |
| 7,828,092 B2 | 11/2010 | Vogel et al. |
| 2002/0043411 A1 | 4/2002 | Heimbrock et al. |
| 2003/0084508 A1 | 5/2003 | Faucher et al. |
| 2003/0097712 A1 | 5/2003 | Gallant et al. |
| 2003/0102172 A1 | 6/2003 | Kummer et al. |
| 2003/0159861 A1 | 8/2003 | Hopper et al. |
| 2003/0192725 A1 | 10/2003 | Heimbrock et al. |
| 2004/0163175 A1 | 8/2004 | Vogel et al. |
| 2005/0065675 A1 | 3/2005 | Georgi et al. |
| 2006/0244466 A1 * | 11/2006 | Call et al. ................. 324/661 |

FOREIGN PATENT DOCUMENTS

| | | |
|---|---|---|
| EP | 0062180 | 10/1982 |
| EP | 0093700 | 11/1983 |
| EP | 0329504 | 8/1989 |
| EP | 0352647 | 1/1990 |
| EP | 0403202 | 12/1990 |
| EP | 0630637 | 12/1994 |
| EP | 0653341 | 5/1995 |
| JP | 09-024071 | 1/1997 |
| JP | 10-181609 | 7/1998 |
| JP | 10-305705 | 11/1998 |
| JP | 2000-118407 | 4/2000 |
| JP | 2004-321722 | 11/2004 |
| KR | 10-2003-0028351 | 4/2003 |
| WO | 87/07830 | 12/1987 |
| WO | WO8707830 | 12/1987 |
| WO | 94/21505 | 9/1994 |
| WO | WO9421505 | 9/1994 |
| WO | 95/20514 | 8/1995 |
| WO | WO9520514 | 8/1995 |
| WO | 96/07555 | 3/1996 |
| WO | WO9607555 | 3/1996 |
| WO | 96/33900 | 10/1996 |
| WO | WO9633900 | 10/1996 |

OTHER PUBLICATIONS

VersaCare ™ Bed Service Manual (MAN333 REV 2), Copyright 2005 by Hill-Rom Services, Inc., Second Edition.

* cited by examiner

SPEED CONTROL FOR PATIENT HANDLING DEVICE

BACKGROUND OF THE INVENTION

The present invention relates generally to patient handling devices, such as beds, stretchers, wheelchairs, and the like, and more particularly to equipment for assisting in the movement of such devices.

Modern health care facilities utilize a wide variety of patient handling devices. Examples of such devices include beds, stretchers, cots, surgery tables, wheelchairs, bed-chairs, and other types of devices that are designed to help support a patient. Most of these devices include one or more wheels that enable them to be pushed throughout different areas of a health care facility, such as a hospital, a nursing home, an assisted living center, or other environments where such devices are used. In some prior art devices, the patient handling devices have included one or more motors that help provide motive force to one or more of the wheels that move the patient handling device. Such motors ease the load that caregivers and other personnel must exert on the patient handling device when the device is moved to different locations.

Patient handling devices equipped with motors that assist in the movement of the devices often include one or more controls that are positioned at one end of the device. When the controls are appropriately manipulated, the device starts moving. In order to stop the device, the caregiver must deactivate the appropriate control. In some situations, the device can be stopped by releasing pressure from a handle, switch, or other safety device that acts as a sort of dead-man's switch. However initiated, the deactivation often does not cause an immediate stopping of the device, but rather allows the device to continue to coast forward and come to a more gradual stop. The gradual stop may allow the patient handling device to continue forward for a distance greater than the length of the device. This lack of an immediate stop helps prevent a patient, who may be riding on the device, from experiencing disruptive acceleration forces.

SUMMARY OF THE INVENTION

The present invention relates to an improved patient handling device that includes features that help improve the ease of maneuvering such power-assisted devices. In some embodiments, the invention provides a patient handling device that includes one or more proximity sensors positioned near an end of the device and adapted to prevent or mitigate collisions with obstacles and/or to help assist in precisely positioning the patient device at a desired location. The proximity sensor(s) are in communication with a controller that automatically makes any necessary speed adjustments to reduce the likelihood of, and/or severity of, a collision between the device and another object.

In one embodiment, a patient handling device is provided that includes a frame, a patient support surface, a plurality of wheels, a motor, a power assist control, a sensor, and a controller. The patient support surface is adapted to at least partially support a weight of a patient positioned on the patient handling device. The plurality of wheels allow the patient handling device to be wheeled to different locations. The motor drives at least one of the wheels. The power assist control is positioned adjacent a first end of the frame and is adapted to be activated, such as by pushing or other means, by a person. The sensor is supported by the frame and detects objects within a proximity to the patient handling device. The controller is in communication with the power assist control, the motor, and the sensor. The controller is adapted to drive the motor in a manner based upon both the activation of the power assist control and the sensor detecting an object within the proximity to the patient handling device.

In another embodiment, a method of controlling a motor adapted to drive at least one wheel on a patient handling device is provided. The method includes providing a sensor on the patient handling device that detects objects within a proximity of the patient handling device; providing a power assist control on the patient handling device that is adapted to be activated by a person; driving the motor in a manner to cause the patient handling device to move forward when a person activates the power assist control; monitoring the sensor to determine if an object is detected by the sensor; and, if an object is detected, determining a distance from the patient handling device to the object and automatically adjusting the motor in such a manner that the patient handling device will reduce its speed even if the person continues activating the power assist control.

According to another embodiment, a method of controlling a motor adapted to drive at least one wheel on a patient handling device is provided. The method includes providing a sensor on the patient handling device that detects objects within a proximity of the patient handling device; providing a power assist control on the patient handling device that is adapted to be activated by a person; driving the motor in a manner to cause the patient handling device to move forward when a person activates the power assist control; monitoring the sensor to determine if an object is detected by the sensor; and, if an object is detected, automatically controlling an absolute speed of the device to match a predetermined speed profile.

According to still another embodiment, a method of controlling a motor adapted to drive at least one wheel on a patient handling device is provided. The method includes providing a sensor on the patient handling device that detects objects within a proximity of the patient handling device; providing a power assist control on the patient handling device that is adapted to be activated by a person; driving the motor in a manner to cause the patient handling device to move forward when a person activates the power assist control; monitoring the sensor to determine if an object is detected by the sensor; and, if an object is detected, determining a speed of the object relative to the patient handling device in a direction oriented parallel to a direction of movement of the patient handling device.

According to another embodiment, a patient handling device is included that includes a frame, a patient support surface, plurality of wheels, a motor, a power assist control, at least one sensor, and a controller in communication with the power assist control, the motor, and the sensor. The patient support surface at least partially supports a weight of a patient positioned thereon. The wheels allow the patient handling device to be rolled to different locations. The motor drives at least one of the wheels. The power assist control is positioned adjacent a first end of the frame and may be activated by a user. The sensor is supported by the frame and detects objects within a proximity to the patient handling device. The controller drives the motor in a manner based upon a relative velocity between the patient handling device and an object detected by the sensor.

According to still other embodiments, the controller on the patient handling device may be configured to reduce a speed limit for the motor with increasing closeness of the object to the sensor. The controller may also accelerate the patient handling device, as appropriate, to follow the speed profile. The sensor may be positioned at a first end of the patient handling device and the power assist control may be positioned at an opposite end. The patient handling device may further include a speed sensor adapted to detect an absolute speed of the patient handling device and communicate the absolute speed to the controller wherein the controller controls the speed of the motor in a manner based at least partially upon the absolute speed of the patient handling device. The patient handling device may further include multiple siderails positioned on opposite sides of the frame, as well as a lifting device adapted to raise and lower the patient support surface. The device may further include four or more cantered wheels and at least one non-castered wheel, the latter being driven by the motor. The controller may also be in communication with a brake and the controller may activate the brake in order to carry out the desired speed control. The patient handling device may further include sensors that detect a weight of a patient supported on the patient support surface and the controller may use this weight information in controlling the speed of the motor when an object is detected. An actuator may also be provided on the patient handling device that raises and lowers the one or more driven wheels into and out of contact with the floor.

DETAILED DESCRIPTION OF THE EMBODIMENTS

Figure 1:
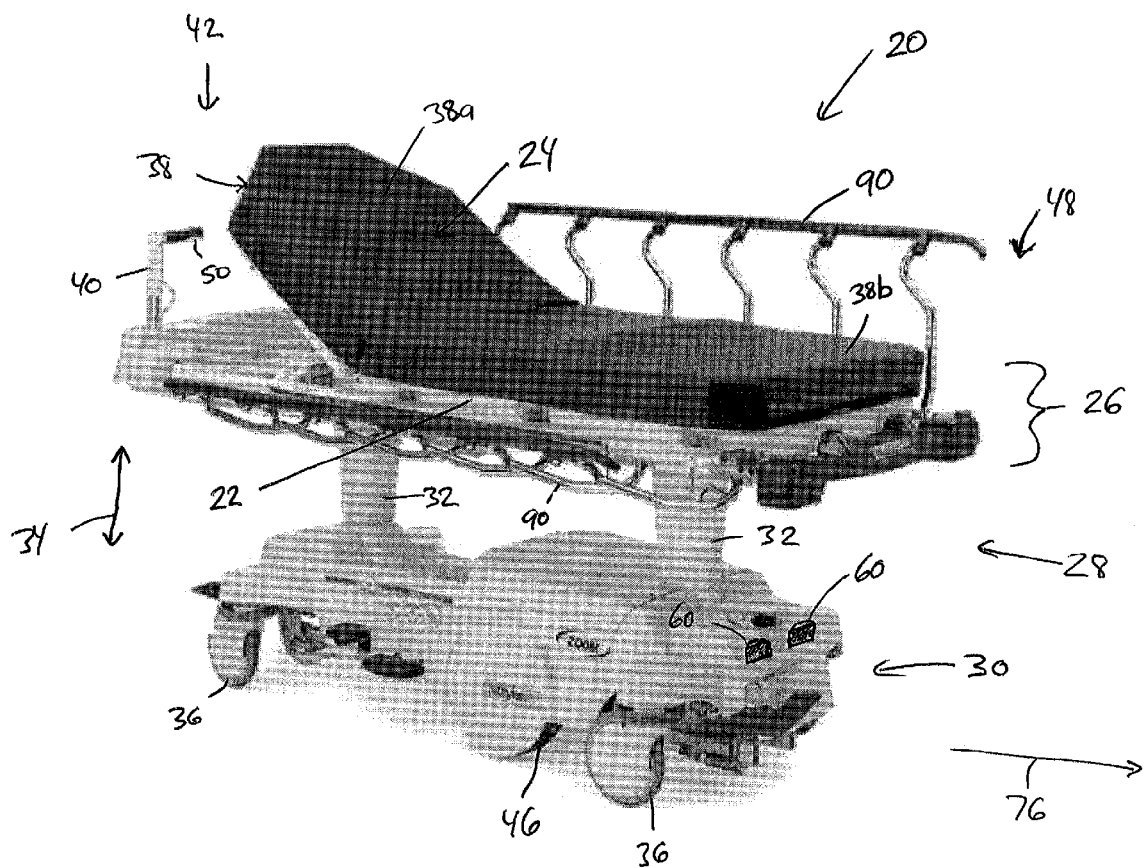
FIG. 1 is a perspective view of one type of patient handling device to which the various aspects of the invention may be applied.

A patient handling device 20 according to one embodiment is depicted in FIG. 1. In the embodiment illustrated, patient handling device 20 is a stretcher adapted to support a patient in a health care setting, such as a hospital, clinic, assisted living home, or other environment where the use of stretchers is beneficial. Patient handling device 20 may take on a variety of different forms, including beds, cots, wheelchairs, surgery tables, or any other type of device adapted to support a patient in a health care setting. One example of an alternative patient handling device 20 is partially illustrated in FIG. 5. Other alternative designs may also be used.

Patient handling device 20 includes a patient support surface 22 on which a patient may sit or lie (FIG. 1). Support surface 22 may include a mattress 24 positioned thereon, or some other type of cushioning structure to provide a more comfortable surface on which a patient may be positioned. Patient support surface 22 is supported by a top portion 26 of a frame 28. Frame 28 includes a base 30 and a pair of lifting members 32. Lifting members 32 are each configured to adjustably move top portion 26 vertically up and down. That is, lifting members 32 are each configured to move top portion 26 in a direction indicated by double-headed arrow 34. Such lifting may be carried out by hydraulic controls, electrical controls, or other means. Base 30 of patient handling device 20 includes a plurality of undriven, castered wheels 36 that each may be positioned generally near the four corners of base 30.

Top portion 26 of frame 28 may include a plurality of independently pivotable sections 38 that allow a patient lying on mattress 24 to have their posture adjusted. For example, in the patient handling device 20 illustrated in FIG. 1, top portion 26 includes an upper section 38a, often referred to as a Fowler section, positioned in the region where the torso of a patient's body would lie. Upper section 38a is pivotable about a horizontal pivot axis that is oriented generally perpendicular to the longitudinal extent of patient handling device 20. The pivoting of upper section 38a enables a patient to switch between lying completely flat on support surface 22 and sitting up with his or her torso nearly vertical, as well as variations in between. Patient handling device 20 may further include one or more lower sections 38b that may be pivotable about horizontal pivot axes, such as a knee gatch, and/or other pivotable or non-pivotable sections. Such additional pivotable sections 38, if any, allow the orientation of the patient's thighs and/or legs to be changed from a purely flat orientation to raised orientations.

Figure 2:
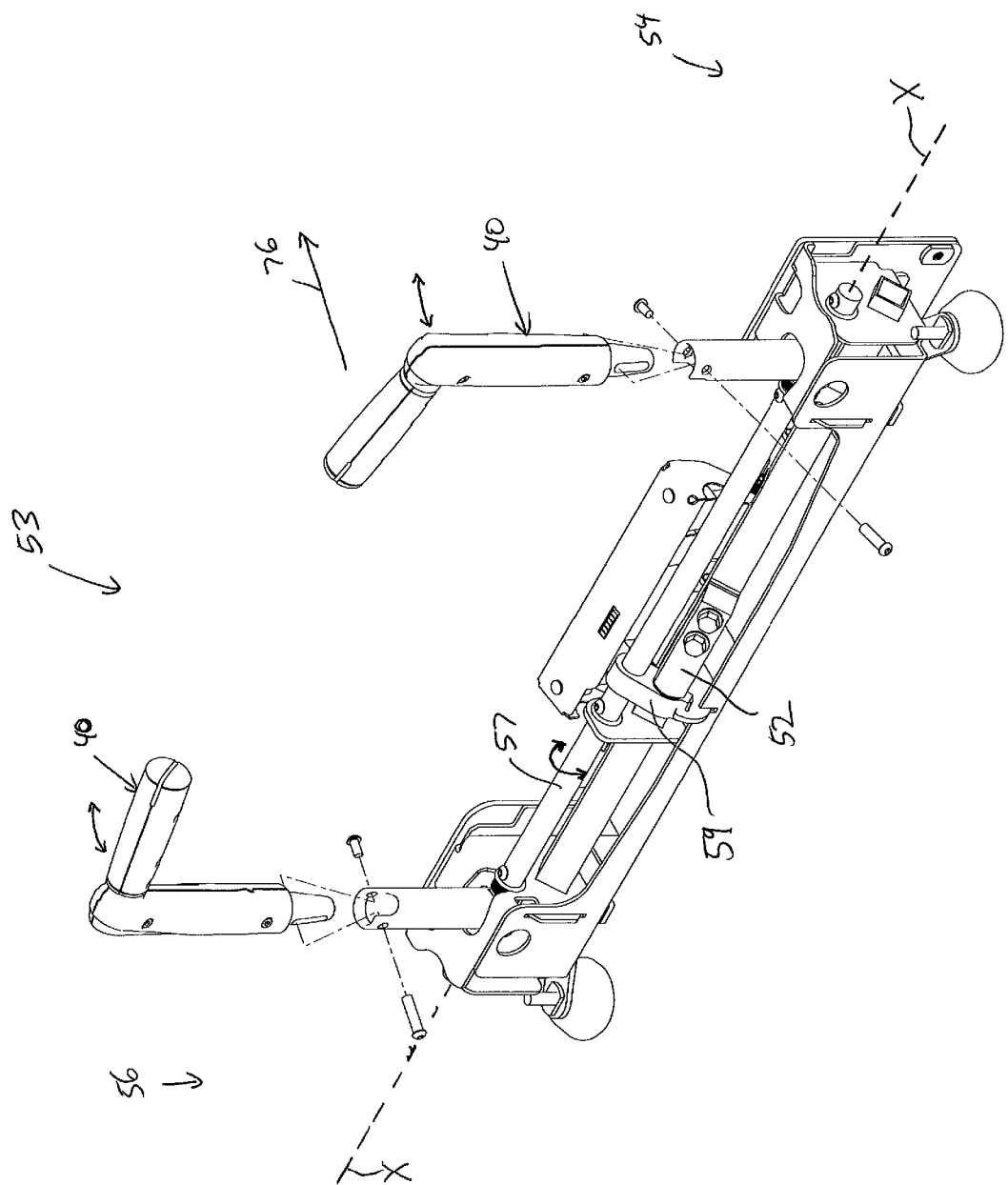
FIG. 2 is a perspective, exploded view of a power assist control of the patient handling device of FIG. 1.

Patient handling device 20 further includes one or more handles 40 positioned at a head end 42 of device 20. In the illustration of FIG. 1, only a single handle 40 is visible in the nearest corner of the head end 42. However, the embodiment depicted in FIG. 1 includes another handle 40 that is positioned in the far corner of head end 42. This other handle is visible in FIGS. 2-4. In other embodiments, only a single handle 40 may be provided, or a handle that is attached at two different attachment points may be provided in still other embodiments. In the embodiment of FIG. 5, patient handling device 20 includes only a single handle 40 that extends from a first side 54 to a second side 56 of device 20. Further detail about the operation of handle 40 in FIG. 2 is provided below, as well as in commonly assigned U.S. Pat. No. 6,772,850 issued to Waters et al, and entitled POWER ASSISTED WHEELED CARRIAGE, which was filed on Jan. 21, 2000, and the complete disclosure of which is hereby incorporated herein by reference. Other types of handles may also be used, as well as other types of structures that perform a function similar to that of handle 40, as described below.

Regardless of the specific configuration of handle(s) 40, they may be grasped by a caregiver and used to push and/or pull patient handling device 20 such that it may be wheeled to a different location. Patient handling device 20 is equipped with a motor 44 (FIG. 7) that drives one or more drive wheels 46. Motor 44 is activated by a user pushing or pulling on handles 40 and thereby activating one or more handle sensors 52 (FIGS. 3-4 and 6-7). Handle sensor 52 is configured such that when a user pushes on handles 40 toward a foot end 48 of patient handling device 20, motor 44 powers drive wheels 46 in a manner causing patient handling device 20 to move in a forward direction 76 (FIG. 1). When a user pulls on handles 40 toward head end 42, handle sensor 52 may activate motor 44 such that it powers drive wheels 46 in an opposite direction, thereby causing patient handling device 20 to move rearward. Handle 40 and handle sensor 52 thus act together as a power assist control 53 and motor 44 acts as a power assistance device by providing motive force for moving patient handling device 20 to new locations, thereby reducing the amount of force that a caregiver must exert when pushing or pulling device 20. Motor 44 therefore helps reduce the workload of caregivers who are tasked with transporting devices 20 to new locations.

Figure 3:
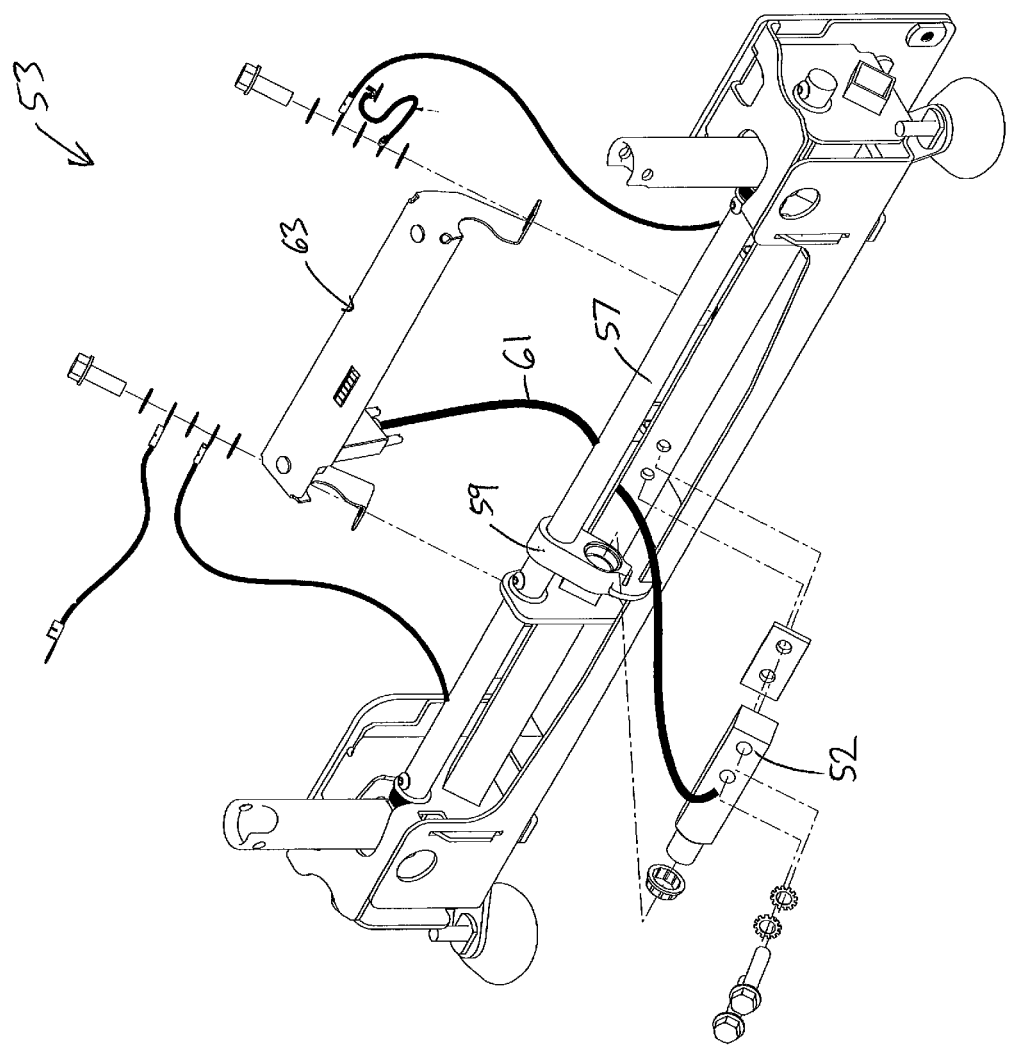
FIG. 3 is another perspective, exploded view of the power assist control of FIG. 2.
Figure 4:
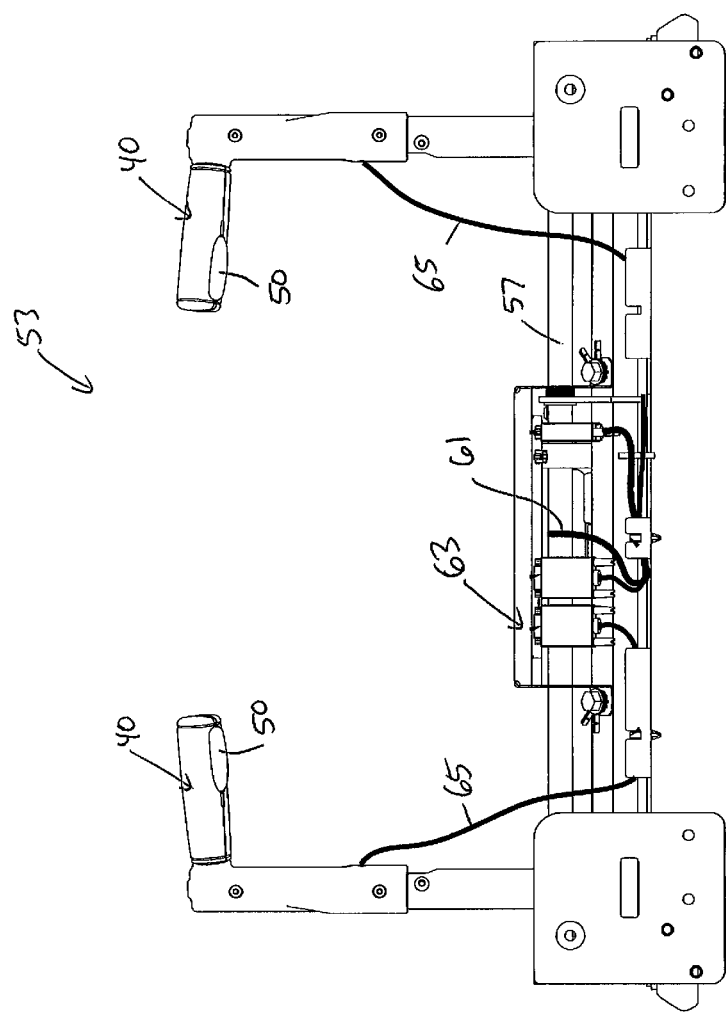
FIG. 4 is a rear, elevational view of the power assist control of FIG. 2.
Figure 5:
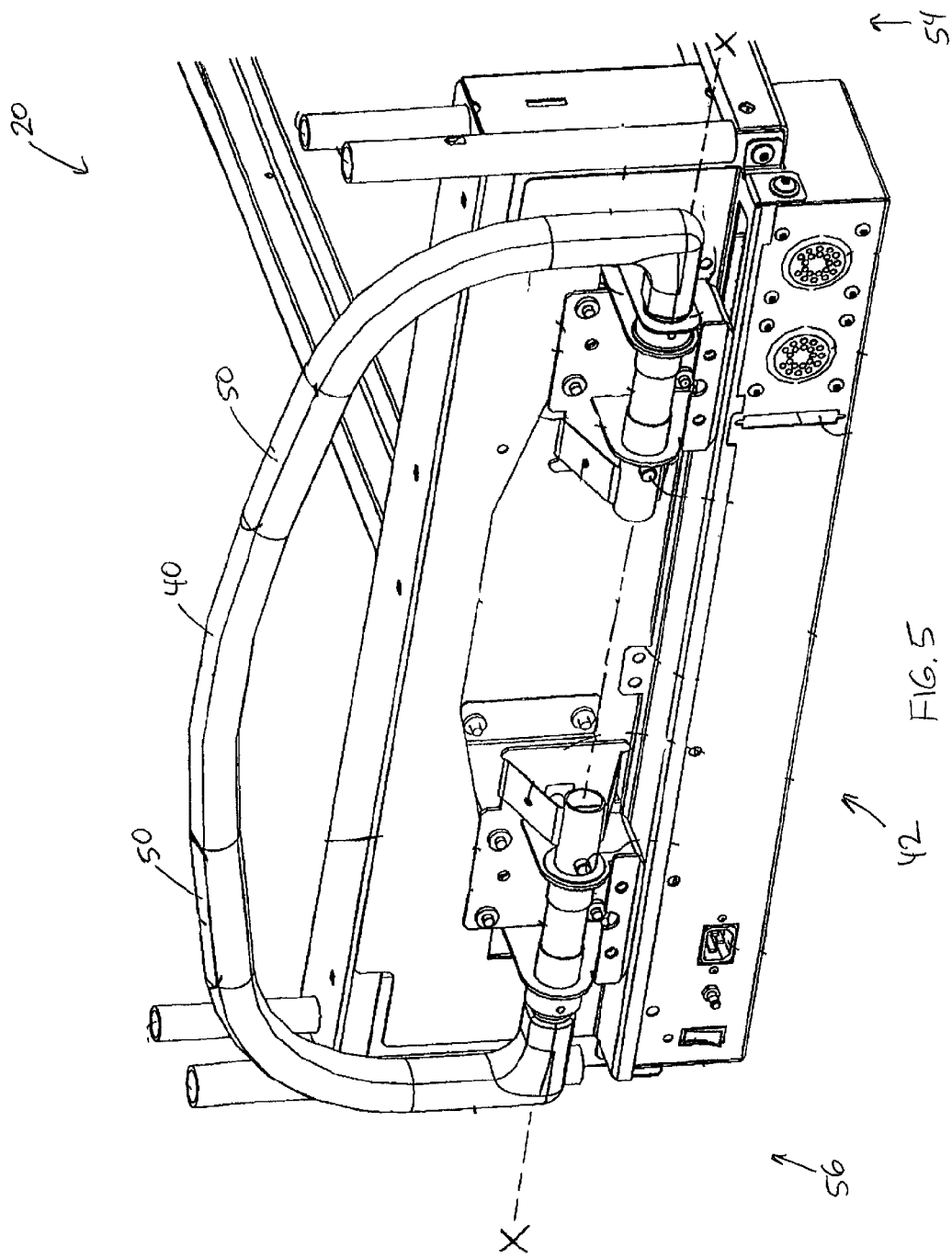
FIG. 5 is a partial, perspective view of an alternative power assist control for a patient handling device.

FIGS. 2-4 illustrate one suitable construction of a power assist control 53 that may be used with patient handling device 20, although other constructions are possible. Each handle 40 is physically coupled to a horizontal pivot bar 57 that is rotatable about a horizontal pivot axis X. When a user pushes on either of handles 40 in forward direction 76, the movement of handles 40 causes pivot bar 57 to rotate. This rotation causes a weldment 59 positioned generally near the center of pivot bar 57 to exert a force on handle sensor 52. In the embodiment shown in FIGS. 2-4, handle sensor 52 is a load cell that detects the forces exerted on it due to the movement of weldment 59. As shown in FIGS. 3-4, a sensor cable 61 transmits the forces detected by sensor 52 to a printed circuit board assembly (PCB) 63. PCB assembly 63 may contain a controller 58 that carries out the functions described below, or PCB assembly 63 may be an intermediary component which forward signals onto controller 58, which may be located at another suitable location on patient handling device 20.

Figure 6:
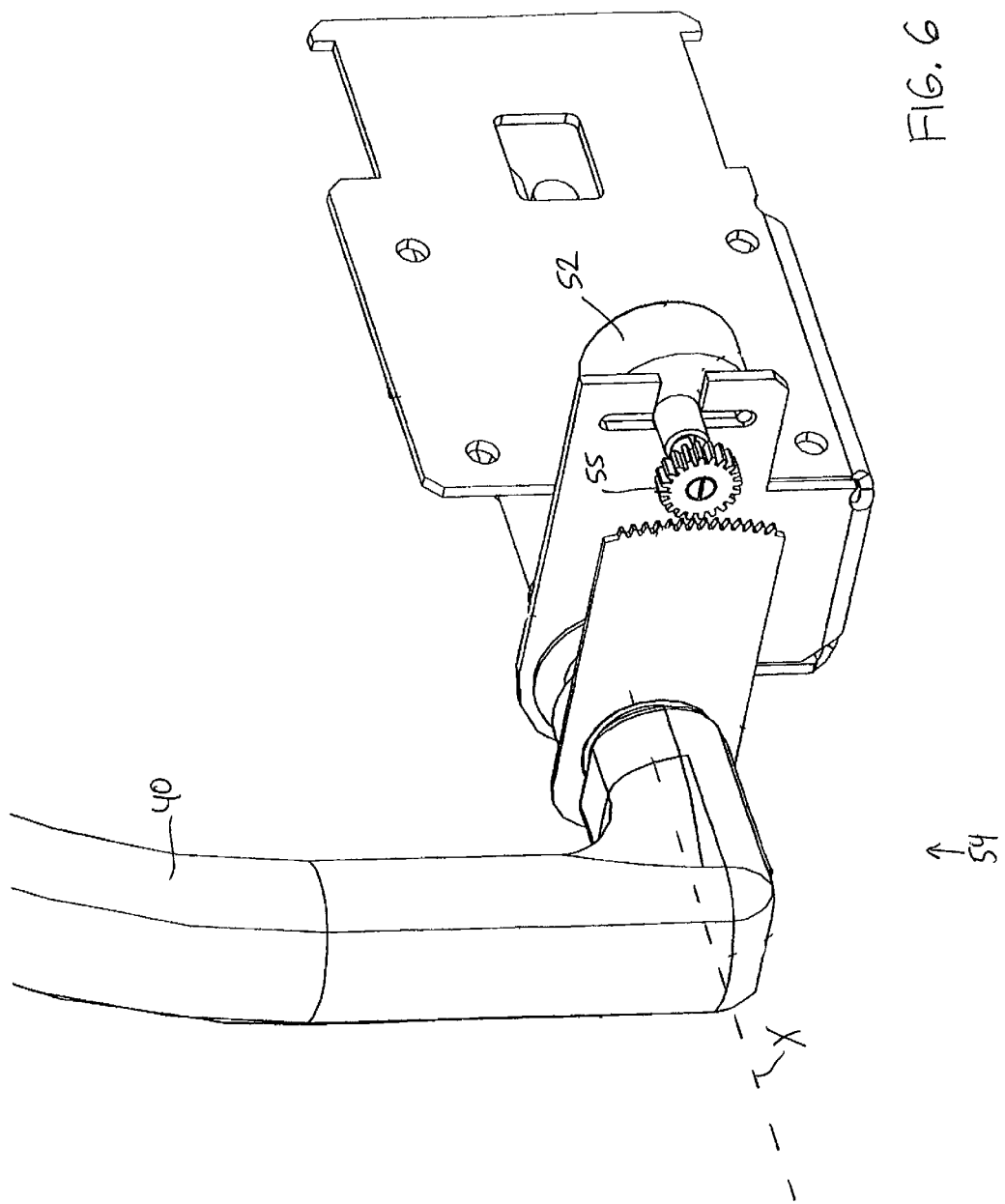
FIG. 6 is a close-up partial perspective view of a sensor and surrounding components of the power assist control of FIG. 5.

The configuration and location of handle sensor 52 and the manner in which handles 40 control the movement of motor 44 may be varied in any suitable manner. In lieu of a load cell, handle sensor 52 may comprise one or more capacitive sensors, pressure sensors, resistance sensors, mechanical sensors, or other types of sensors. Handle sensor 52 may also be placed in locations other than as shown in FIGS. 2-4. In the embodiment shown in FIG. 6, handle sensor 52 is a potentiometer whose resistance changes in response to rotation of a gear 55. Gear 55 is rotated in response to the rotation of handle 40 about horizontal pivot axis X (FIG. 5-6). The movement of handle 40 thereby causes a change in the resistance of potentiometer, which is electrically communicated to the controller 58 on the patient handling device 20 (FIG. 4). Controller 58 may take on any suitable form and may be a microprocessor, a field programmable gate array (FPGA), an application specific integrated circuit (ASIC), discrete circuitry, a microcontroller, or other suitable electronic hardware, firmware, and/or software, or any suitable combination of these or other components. However configured, controller 58 is in communication with motor 44 and controls motor 44 such that patient handling device 20 moves forward when handle 40 is pushed forward (as would be sensed by sensor 52), and the patient handling device moves backward when the handle is pulled backward (as would be sensed by handle sensor 52). The speed at which the patient handling device moves in response to the movement of the handle 40 may be directly proportional to the amount of rotation of the handle, or it may be correlated in another manner besides direct proportionality, such as by a plurality of discrete speeds, an exponential correlation, or in other manners.

In the embodiments of FIGS. 1-6, each of the handles 40 of patient handling device 20 include a safety switch 50. Safety switches 50 act as a sort of dead man's switch. That is, at least one of the safety switches 50 must be continuously activated, such as by pushing by a user, in order to allow the powered assistance of motor 44 to take place. Stated alternatively, the pressing of safety switches 50 is a necessary, though not complete, precondition for making motor 44 operate. It is not a complete precondition because motor 44 will not drive any of drive wheels 46 unless handle 40 is also pushed forward, or pulled backward, thereby activating one or both of handle sensors 52. Thus, a user wishing to have patient handling device 20 move forward via the power of motor 44 must first press at least one safety switch 50 and then push forward on handle 40 to activate the associated handle sensor 52. If the person merely pushes forward on handle 40 and activates one of the handle sensors 52 without also pressing a safety switch 50, then motor 44 will not drive any of drive wheels 46. Thus, a person who pushes forward on handle 40 and activates handle sensor 52 without also pressing a safety switch 50 will have to manually supply all of the necessary force to get the wheels on patient handling device 20 to turn without any assistance from motor 44.

In some embodiments, only a single one of safety switches 50 needs to be pushed in order to enable the use of motor 44. That is, if a person pushes on only a single one of safety switches 50, motor 44 will be enabled such that any forward pushing the respective handle 40 (as sensed by sensors 52) will cause motor 44 to drive the drive wheels 46. If a person stops pressing the single pressed safety switch 50 during the transport of patient handling device 20, then motor 44 will stop supplying motive force to drive wheels 46, regardless of whether or not handle sensor 52 continues to be activated by the person's continued pushing. Thus, the release of safety switches 50 will stop the driving of drive wheels 46 and override any drive signals that are being generated by handle sensors 52. In other embodiments, patient handling device 20 can be configured such that both of safety switches 50 need to be pressed in order to activate motor 44. In such embodiments, if a person stops pressing either one of safety switches 50, motor 44 will stop supplying motive force to drive wheels 46 regardless of whether or not either of handle sensors 52 continue to be activated by the person.

Safety switches 50 may be implemented in a variety of different physical manners, including, but not limited to, buttons, levers, capacitive sensors, pressure sensors, or any other type of sensor that is capable of detecting a user's continued intent to utilize motor 44 for transportation assistance of patient handling device 20. Each safety switch 50 may forward its electrical signals to PCB assembly 63 via a safety switch cable 65 (FIGS. 3-4), which then forwards the signal to controller 38, or cable 65 may connect directly to controller 58.

It will be understood by those skilled in the art that, although power assist control 53 has been described herein as comprising one or more handles 40 and one or more corresponding handle sensors 52, the makeup of power assist control 53 can be varied. For example, one or both of handles 40 could be replaced by a one or more levers, buttons, pedals, touch-pads, joysticks, or other suitable devices which can be activated by a user in order to command patient handling device 20 to move. Further, the one or more sensors 52 can be suitably modified according to the particular type of device used to command patient handling device 20 to move. Further, power assist control 53 may or may not include any safety switches 50 or sensors 52. Power assist control 53 can therefore be implemented in any suitable form that provides an indication to a controller to control the operation of motor 44.

Figure 7:
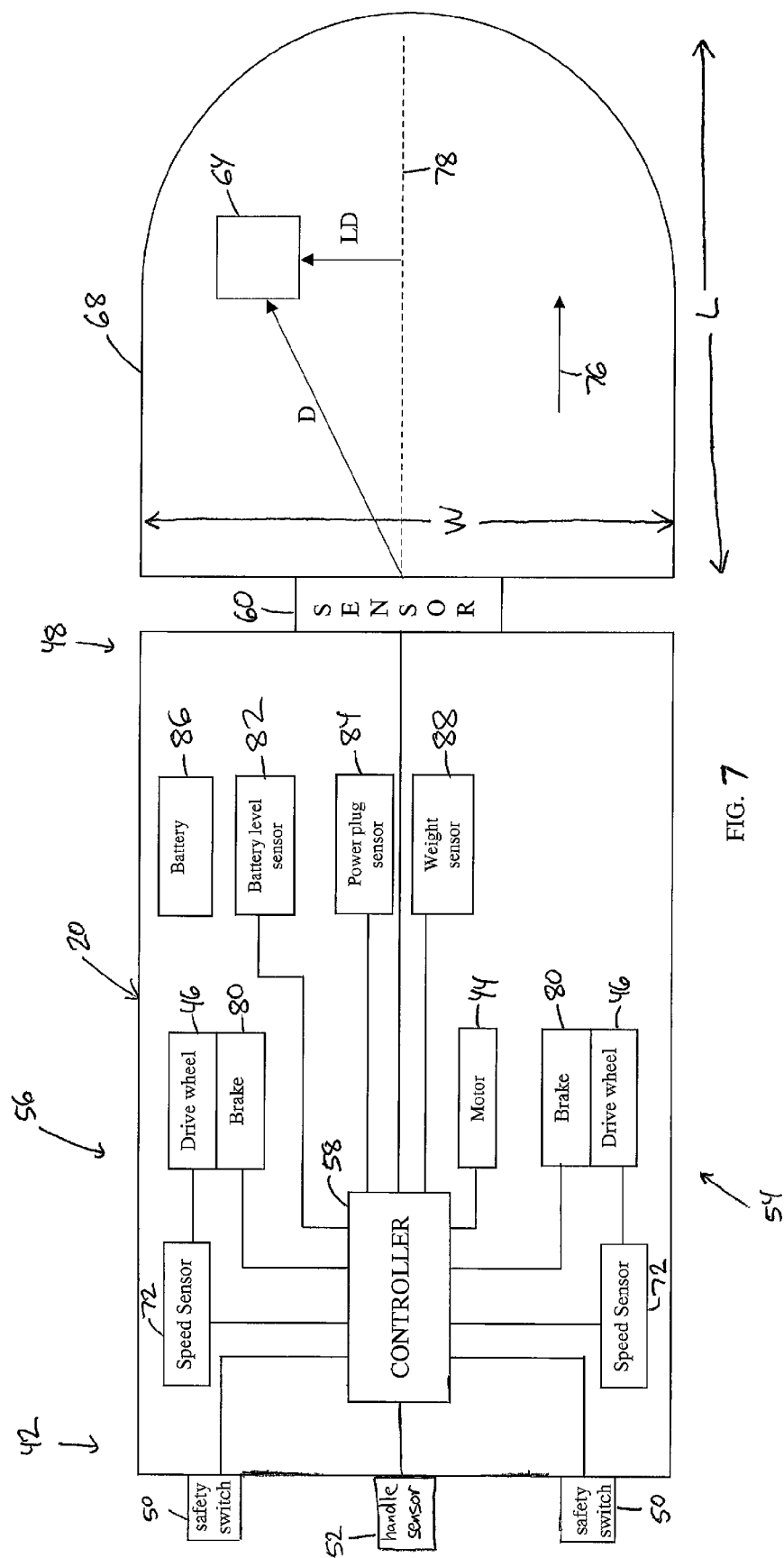
FIG. 7 is a plan view diagram of a patient handling device according to one embodiment.

Patient handling device 20 may be configured to either include only a single drive wheel 46 or to include multiple drive wheels 46. An example of a patient handling device having two separate drive wheels 46 is illustrated in FIG. 7. When configured with two drive wheels 46, one drive wheel 46 may be positioned along a first side 54 of device 20, and the other drive wheel 46 may be positioned along a second side 56 opposite to first side 54. Further, when equipped with dual drive wheels 46, patient handling device 20 may be configured such that the activation of a single safety switch 50, along with a single handle sensor 52, both of which may be positioned on first side 54 of device 20, may cause power to be supplied to only the drive wheel 46 on the first side 54 of the device 20. Stated alternatively, supplying power to drive wheel 46 on first side 54 of device 20 may be accomplished by only activating the safety switch 50 and a handle sensor 52 that is also located on first side 54. In such cases, the activation of the safety switch 50 and handle sensor 52 on second side 56 of device 20 will cause the drive wheel 46 on the second side 56 to be powered. Such a configuration may allow a person to more easily steer patient handling device 20. If it is desirable to turn the device rightward, the person may push only on the left handle 40 (along with the left switch 50 and sensor 52) to cause only the left drive wheel 46 to rotate. The rotation of only the left drive wheel 46 will tend to push the device 20 rightward because off of the off-center location of the left drive wheel 46. To turn the device leftward, the person would push in a similar manner only against the right handle 40 (and right switch 50 and sensor 52), thereby driving only the right drive wheel 46. To move the device 20 straight forward, the person would push on both of the right and left handles 40 simultaneously (along with their respective switches 50 and sensors 52).

When patient handling device 20 is configured such that the two drive wheels 46 may be activated independently of each other, device 20 may be constructed to include multiple motors—one for each drive wheel. Alternatively, patient handling device 20 might include a single motor tied to independent transmissions, or other independent structures that allow for the individual control of each drive wheel 46.

In other embodiments where there are multiple drive wheels 46, patient handling device 20 may be constructed such that there is a single sensor 52. In such cases, both drive wheels 46 will be activated and deactivated simultaneously by the action of power assist control 53. The simultaneous activation and deactivation of drive wheels 46 may be carried out regardless of whether a person presses or releases only a single one of safety switches 50.

The signals from the one or more safety switches 50 and handle sensors 52 are communicated to controller 58 positioned on-board patient handling device 20. Controller 58 may be comprised of one or more microprocessors, discrete logic circuits, ASICs, FPGAs, embedded logic units, or any other suitable electronic circuitry or electronic components suitable for carrying out the control algorithms discussed herein, as would be known to one of ordinary skill in the art. Controller 58 is in communication with motor 44 and transmits the appropriate signals to motor 44, or to an intermediate motor controller, that cause motor 44 to respond in the manners described herein. Controller 58 is configured such that the amount of electrical power that is delivered to motor 44 can be controlled. This allows controller 58 to cause motor 44 to generate a torque and to cease the generation of the torque, as well as to control the amount of torque applied. One or more speed sensors 72 may be included that sense the speed, and/or other parameters, of motor 44 and feed such information back to controller 58 such that the speed, or other characteristics, of motor 44 may be controlled in a closed-loop manner (FIG. 7). In alternative embodiments, motor 44 may also be controlled by controller 58 in an open loop manner. In some embodiments, patient handling device 20 may be configured such that motor 44 never moves drive wheels 46 at speeds in excess of certain predefined limits. The limits may be different depending upon the direction in which patient handling device 20 is being moved. For example, controller 58 may be configured to limit the forward speed of drive wheels 46 to an approximate walking speed, such as 3.0 to 4.0 miles per hour, and controller 58 may be further configured to limit the reverse speed of drive wheels 46 to a slower speed, such as 1.0 to 2.0 miles per hour. Other speed limits, or no speed limits at all may, of course, be used. Such speed limits refer to limits that are imposed when no obstruction is detected in the path of device 20 and, as will be discussed below, such limits may be overridden by other speed controls when an object in the path of device 20 is detected.

Whatever the precise value of the speed limits that may be used, if any, patient handling device 20 may be configured such that a person can push or pull device 20 faster than the speed limits if the person manually supplies the requisite motive force to the device 20. That is, if a person pushes on patient handling device 20 while also causing motor 44 to power drive wheels 46, it may be possible for the patient handling device 20 to exceed the programmed speed limit, depending upon how much force the person manually applies to device 20. In other embodiments, controller 58 and motor 44 may be configured such that motor 44 actively resists any manual pushing on device 20 that would cause device 20 to exceed the set speed limits. In this latter embodiment, motor 44 would react to a person pushing on device 20 that was already traveling at the speed limit by reducing the power to motor 44 such that device 20 did not exceed the speed limit, or by activating one or more brakes on device 20, or, in certain situations, by applying a reverse torque to drive wheels 44. Other variations are also possible.

Patient handling device 20 includes one or more proximity sensors 60 (FIGS. 1 and 7) positioned generally near the foot end 48 of device 20. As will be discussed in greater detail below, proximity sensors 60 are used in conjunction with controller 58 to help automatically reduce the likelihood and/or severity of collisions of patient handling device 20 with objects 64, such as walls, corners, equipment, personnel, and other types of objects. In the embodiment illustrated in FIG. 1, device 20 is shown with two proximity sensors 60 attached at a foot end of base 30. It will be understood by those skilled in the art that the number of proximity sensors can be varied from that shown in FIG. 1. In some embodiments, only a single proximity sensor 60 may be used. In other embodiments, an entire array of proximity sensors 60 may be mounted to the foot end 48 of device 20. It will also be understood that the position of proximity sensors 60 may be varied from that shown in FIG. 1. That is, instead of mounting proximity sensors 60 to base 30, they might alternatively be mounted to top portion 26 of frame 28, or to both top portion 26 and base 30.

Figure 8:
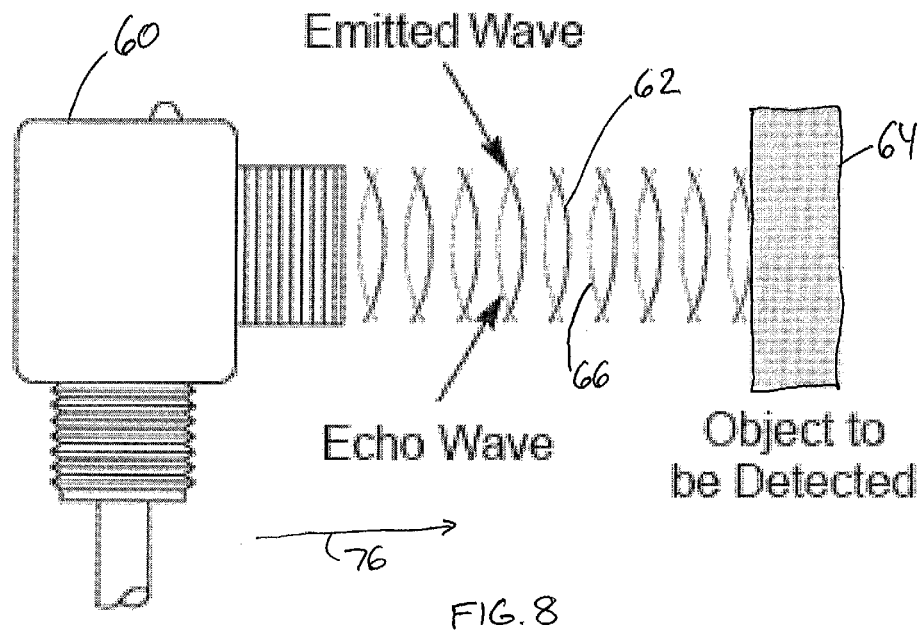
FIG. 8 is an elevational schematic diagram of a proximity sensor that may be used with the patient handling devices of FIGS. 1 and 5.

Regardless of the position and number of proximity sensors 60 in a particular embodiment of patient handling device 20, each proximity sensor 60 functions to detect the presence of one or more objects 64 within a vicinity 68 (FIG. 7) of the proximity sensors 60. The construction of proximity sensors 60 may take on any of a variety of forms, including, but not limited to, an ultrasonic sensor, a capacitive sensor, a photoelectric sensor, an inductive sensor, a camera, or a mechanical sensor. Such sensors are known to those skilled in the art. In general, many of these sensors operate in a manner in which a wave 62 is emitted from the proximity sensor 60 in a forward direction 76 with respect to the patient handling device 20 (FIG. 8). As noted above, the emitted wave may be an ultrasonic wave, an electromagnetic wave, or other type of wave. Upon encountering an object 64 within a certain vicinity to the proximity sensor 60, a portion of the emitted wave 62 is reflected back towards the patient handling device 20 by the object 64. Proximity sensors 60 may each include sensors for detecting the reflected wave 66. In some embodiments, the device for emitting the wave 62 may be physically separate from proximity sensors 60. For purposes of description herein, proximity sensors 60 will be hereafter described as containing both the emitters and the sensors for detecting the reflected waves 66, although it will be understood by those skilled in the art that the sensors may be physically separated from the structure(s) that emit the emitted waves 62, and that the following discussion is not meant to imply that a common structure must be used for both emitting and detecting waves.

Wherever positioned, the proximity sensors 60 detect the reflected waves 66 and use information regarding the reflected waves 66 to determine a distance D of the object 64 from patient handling device 20 (FIG. 7). The manner in which the proximity sensors 60 detect distance D may be based upon any known techniques, such as by measuring the time-of-flight (TOF) of the emitted wave to travel from the proximity sensors 60 to the object 64 and back, multiplying that time by the expected speed of the wave, and then dividing by two (to account for the fact that the wave travels both to and from the object 64). Another technique may include measuring the amplitude of the reflected waves 66 and comparing that amplitude to the amplitude of the emitted waves 62 and using an attenuation conversion factor to determine the distance D to object 64. Another technique may include a combination of the TOF measurements and amplitude measurements. Still other techniques may also be used.

Proximity sensors 60 are arranged in both their numbers and their physical location, as well as their operational design, to detect objects within a certain proximity 68 to patient handling device 20 (FIG. 7). The size, location, and shape of proximity 68 may be varied in different embodiments. In the embodiment illustrated in FIG. 7, proximity 68 is positioned adjacent foot end 48 of patient handling device 20 and extends for a length L and width W. Width W may be generally about the same as the width of patient handling device 20; that is, it may generally be close to the distance from first side 54 of device 20 to second side 56 of device 20. In other embodiments, it may be helpful to make width W noticeably smaller than the width of device 20 in order to reduce the likelihood of objects to the side of device 20 impacting the speed control of device 20. In other embodiments, width W may be set somewhat larger than the width of patient handling device 20 so that objects that are not directly in front of device 20 may be detected. This may mitigate collision dangers if patient handling device 20 turns as it moves forward. In some embodiments, the size of width W may range from two feet to six feet, although values outside these ranges may of course also be used.

As noted, in other embodiments, the width W may be set smaller than the width of patient handling device 20 with the expectation that the person controlling device 20 will steer it to avoid objects that may only partially lie in the forward path of patient handling device 20. In still other embodiments, patient handling device 20 may be constructed such that the width W of proximity 68 may be variable, including a variability that automatically adjusts to a larger value upon detecting that device 20 is turning and automatically returns to a lower value when device 20 is traveling straight. The width W of proximity 68 may alternatively be controller by the user of device 20 by one or more controls positioned on device 20. Still other variations are possible.

The length L of proximity 68 may generally be equal to or greater than the expected braking distance of patient handling device 20. That is, length L of proximity 68 may be set such that, at a minimum, it is at least equal to the distance that device 20 would typically travel when decelerating from its highest speed limit to a stopped condition. Such deceleration may include active braking, or such deceleration may include cutting off power to motor 44, in which case the device 20 would simply coast to a stop. Length L may also be much greater than the minimum expected stopping distance of device 20, including multiples of this distance. In some embodiments, length L may range from 10 to 15 feet, although it will be understood that other values for Length L may be used. Indeed, in some embodiments, the length L may be variable, and patient handling device 20 may be configured to take into account the weight of device 20 in determining the length L. In such embodiments, the length L may be increased when device 20 is occupied, due to the greater mass and greater required braking distance, and length L may be decreased when not occupied. Patient handling device 20 may include one or more weight sensors 88 (FIG. 7), such as load cells or the like, that measure the weight of a patient and/or other equipment supported on device 20, and device 20 may be configured to utilize this weight information to dynamically adjust length L. Still other variations are possible.

The width W and length L may be set by the choice of proximity sensors 60, their position, and/or the number of sensors utilized. Either or both of these variables may also be set by the particular manner in which the reflected waves 66 are processed. For example, the length L may be set by ignoring any detected reflected waves 66 that have a time-of-flight that corresponds to a distance greater than the selected length L. The width W may also be set through processing algorithms, for example, by processing only those components of reflected waves 66 that are detected within a specified angular range when directionally sensitive proximity sensors 60 are used. Other algorithms may also be used to control the width W and length L of proximity 68.

When viewed from above, such as shown in FIG. 7, the shape of proximity 68 is generally rectangular, although the boundaries of proximity 68 may be more curved than that illustrated in FIG. 7. The precise plan view shape of proximity 68 may be varied from that shown in FIG. 7 and may depend upon the type and/or arrangement of the one or more sensors 60. When viewed from the side (the elevational view), the shape of proximity 68 may also be generally rectangular, although it may be other shapes as well, such as fan-shaped, or other shapes. In some embodiments, proximity sensors 60 may be positioned at multiple positions on patient handling device 20 that are vertically separated from each other. As but one of multiple possible examples, one or more proximity sensors 60 may be positioned on base 30 while one or more proximity sensors 60 may be positioned on top portion 26 of frame 28. In general, the shape and size of proximity 68 should be chosen such that proximity sensors 60 have a high likelihood of detecting most, if not all, objects 64 for which collisions are desirably avoided through automatic control. The shape and size of proximity 68 may therefore be application and/or environment specific.

When the reflected waves 66 are detected by proximity sensors 60, the proximity sensors 60 produce electrical signals that are processed in order to determine the distance D to the one or more detected objects 64. This processing may be carried out by suitable electronic circuitry that is part of, or positioned near, proximity sensors 60, or it may be carried out by controller 58, or it may be carried out in a divided manner with some processing being done locally at proximity sensors 60 and some being done at controller 58. Regardless of how the signals corresponding to reflected waves 66 are processed, controller 58 uses these signals to determine the distance D to one or more objects 64. This distance D determination is carried out multiple times a second. That is, proximity sensors 60 send out an emitted wave 62 multiple times a second and "listen" for corresponding reflected waves 66 multiple times a second. From a comparison of the multiple distance measurements and the time that elapses between them, controller 58 is able to calculated the relative speed between device 20 and the object 64.

Figure 9:
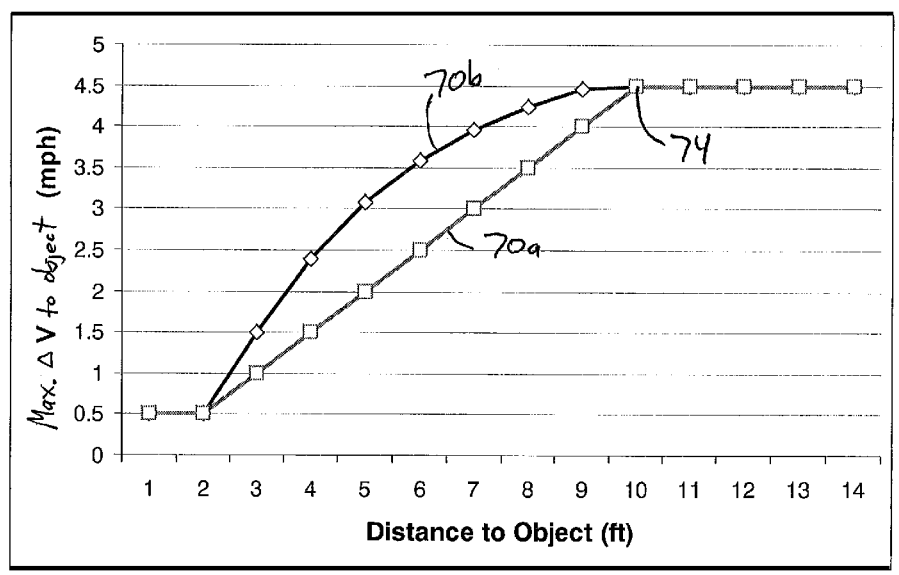
FIG. 9 is a chart illustrating a plurality of speed profiles for controlling the speed of the patient handling device based upon a distance to a detected object.

Controller 58 uses the determination of distances D and the relative velocity to the objects 64 in carrying out its control of the speed of motor 44. More particularly, controller 58 will control the speed of motor 44, and thus patient handling device 20, based upon the calculated distance D and relative velocity to object 64. The precise manner in which controller 58 controls the speed of motor 44 based upon distance and/or relative velocity can be varied widely. FIG. 9 illustrates two different speed profiles 70a and 70b for controlling device 20 based upon the distance D to a detected object. The distance D to the object is shown along the x-axis of the graph of FIG. 9. The acceptable relative velocity (ΔV) between patient handling device 20 and the object 64 is illustrated along the y-axis of the graph of FIG. 9. Controller 58 will send appropriate commands to motor 44 to cause patient handling device 20 to move in such a manner that the maximum relative velocity between device 20 and object 64 generally matches a profile stored in a memory 71, such as profiles 70a, 70b, or some other speed profile.

FIG. 9 illustrates two different suitable speed profiles 70a and 70b that controller 58 may follow in carrying out its speed control of device 20. Speed profiles 70a and 70b overlap in the range of 1-2 miles per hour, as well as the range of 10 to 14 miles (and above). In the range of 2 to 10 miles per hour, speed profiles 70a and 70b differ, with speed profile 70a having a linear variation and speed profile 70b having a non-linear variation. Other speed profiles may be used having different shapes than those illustrated by profiles 70a and 70b. Other speed profiles may also be used that have different transition points at which the speed limit changes occur besides the 2 mph and 10 mph transition points shown in FIG. 9. Speed profiles 70a and 70b override the other speed limits that were discussed above (where no object is detected) in relation to handle sensors 52. That is, if handle sensors 52 allow a maximum speed of 4 miles per hour (when no object is detected), but the particular speed profile specifies a maximum speed limit of 3 miles an hour when an object is detected, controller 58 will limit the speed to 3 miles per hour when an object is detected.

If a patient handling device 20 includes a controller 58 that follows speed profile 70a, then controller 58 will allow the device 20 to continue to travel at its maximum speed of 4.5 miles per hour as long as any stationary objects detected by proximity sensors 60 are at least ten feet away from device 20 (i.e. D is greater than or equal to 10 ft). If the object 64 is non-stationary and moving toward device 20 at a non-zero speed, then controller 58 will limit the speed of device 20 such that its relative velocity to the object is no more than 4.5 mph (assuming a distance of 10 ft or greater). If an object is detected that falls within the range of 2 to 10 feet, the controller 58 will automatically set the maximum speed of patient handling device 20 according to the profile 70a shown in FIG. 9. Thus, for example, if an object is detected at five feet, then controller 58 will set the maximum speed of patient handling device 20 such that the relative speed between device 20 and object 64 is not more than approximately 2 miles per hour. In such a case, if the object is moving away from device 20, the absolute speed of device 20 (i.e. speed with respect to the ground) may exceed 2 mph. Thus, it would be possible, for example, for device 20 to be traveling at 4.5 mph while a person (e.g. object 64) was only three feet in front of device 20, provided that the person was walking in the same direction as device 20 with sufficient speed so as to not exceed the relative speed limit of profile 70a (or whatever other speed profile was being followed).

If a patient handling device 20 includes a controller 58 that follows speed profile 70b, then controller 58 will also allow the device 20 to continue at its maximum speed of 4.5 miles per hour as long as any stationary objects detected by proximity sensors 60 are at least ten feet away from device 20. For mobile objects 64, controller 58 may slow down device 20, depending upon the direction of movement of the mobile object. If an object is detected that falls within the range of 2 to 10 feet, the controller 58 will automatically set the maximum speed of patient handling device 20 such that the relative speed matches the profile 70b shown in FIG. 9. Other profiles may be used, including, but not limited to, discrete speed profiles, such as speed profile 70c illustrated in FIG. 10.

The speeds identified by profiles 70a-c are, as noted above, maximum speeds. In other words, patient handling device 20 may be controlled via handle sensor(s) 52 (and safety switch (es) 50) to operate with relative speeds less than those indicated in profiles 70a-c, or whatever other type of speed profile that may be used for device 20. For example, if a person is pushing on handles 40 of patient handling device 20 with an amount of force that causes controller 58, via motor 44, to drive device 20 forward at a speed of two miles per hour, and if the proximity sensor 60 detects a stationary object at a distance D of eight feet, then controller 58 will not undertake any actions that change the then-current speed of device 20 (when following any of profiles 70a-c). Instead, controller 58 will prevent device 20 from moving any faster than about 3.5 miles per hour for profile 70a, or about 4.25 miles per hour for profile 70b, or 2.5 mph for profile 70c. As a result, if a person increases their pushing force on handle sensors 52 to such an extent that controller 58 would otherwise increase the speed of device 20 to 4.5 miles an hour, controller 58 will override the control signals from handle sensors 52 such that the maximum relative speed specified by profiles 70a-c (or another profile) are enforced.

The manner in which controller 58 controls the speed of motor 44 and carries out the necessary speed commands to effectuate the chosen speed profile may be varied in accordance with multiple different known techniques. As but one example, controller 58 may control motor 44 through the use of pulse-width-modulated signals (PWM), such as described in U.S. Pat. No. 6,772,850, where the duty cycle of the PWM signal is correlated to the amount of electrical power supplied to motor 44. Motor 44 can therefore be controlled to operate at a desired speed through the selective alteration of the duty cycle of the PWM control signals. Other types of control techniques may also be used, as would be known to those skilled in the art. Whatever the precise technique used to control the speed motor 44, it may utilize known closed loop feedback principles involving one or more sensors that detect the speed, or other characteristics, of motor 44 and which feed their signals back to controller 58. The degree of fidelity to which the relative speed of device 20 matches the particular speed profile utilized can vary and it is not necessary to precisely match the chosen speed profile. Motor 44 may take on the form of any known type of motor suitable for use with patient handling devices, including, but not limited to, a direct current (dc) motor, an alternating current (ac) motor, a frequency controlled motor, a brushless motor, a brushed motor, a three-phase motor, or other types of motors.

The type of control techniques that are used to implement the selected speed profile 70 may be the same control techniques that are used to implement the speed signals generated as a result of handle sensors 52. In other words, if different forces exerted on handle sensors 52 result in PWM signals being transmitted to motor 44 (or an associated motor controller) that have different duty cycles, then the implementation of the selected speed profile may also be carried out by using PWM signals of variable duty cycles to implement the speed limits of the selected speed profile. In such a case, motor 44 will receive a single PWM signal (or its associated motor controller) that specifies the commanded speed. This single PWM signal will have a duty cycle that, unless it is overridden by controller 58 due to the selected speed profile, will be dictated by the amount of force applied to handle sensors 52. Thus, controller 58 will use the selected speed profile to adjust, if necessary, the control signals applied to motor 44 as a result of handle sensor(s) 52.

Figure 10:
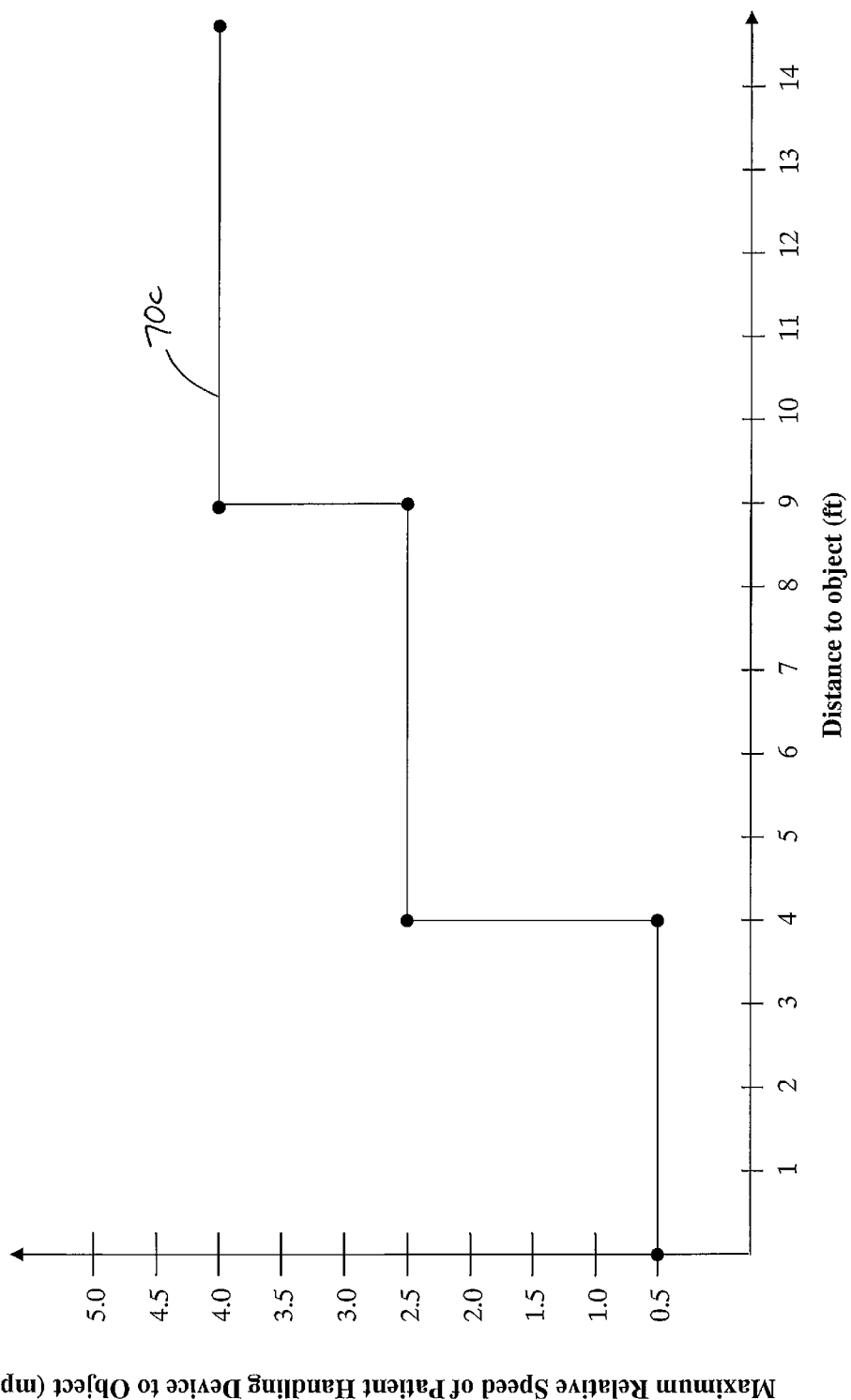
FIG. 10 is a chart illustrating an illustrative discrete speed profile that may be followed, in some embodiments, by the patient handling device.

All of the speed profiles 70a-70c shown in FIGS. 9-10 allow for the patient handling device 20 to continue to move at ½ mile per hour even when an object 64 is detected within a two feet or less of proximity sensors 60. That is, none of speed profiles 70a-70e act to completely stop the patient handling device 20 from moving. This allows a person moving patient handling device 20 to continue to move the device so that it may be accurately positioned at desired locations relative to any object 64 that may be detected, such as walls, other devices, etc. The maximum speed of device 20 when positioned close to object 64, however, is limited to half a mile per hour so that, to the extent the person drives the device 20 into the nearby object 64, the resulting impact should be minimized to the point of having limited, if any, destructive impact, either with respect to device 20, the patient thereon, or the object. As a consequence, for example, if a person is trying to move device 20 such that its foot end 48 will abut against a wall, controller 58 will still allow the person to continue to move device 20 even after the wall become less than 24 inches from the foot end of the device 20. The speed of device 20, however, will be limited such that any eventual collision with the wall will be minimal.

In other embodiments, the speed profile that is used by patient handling device 20 may be one in which the maximum speed of device 20 does reach 0 miles per hour, either at a negligible distance, such as an inch from object 64, or at some other cutoff distance. In such embodiments, the signals from handle sensors 52 will be completely overridden at the cutoff distance so that, for example, if a person continues pushing on handle sensors 52 while an object is detected that is an inch away, motor 44 will remain stopped. In such situations, a person who wanted to move device 20 the remaining inch or so further to the object would have to manually supply all of the motive force necessary to wheel device 20 to the desired stopping point.

In other embodiments, patient handling device 20 may be configured to bring device 20 to a stop right at the movement device 20 abuts against the object. Such a docking mode would include a speed profile that shrank to zero mph at a distance D of zero (or very close thereto). Further, the speed profile of the docking mode may reflect an actual, controlled speed of patient handling device 20, rather than a maximum permissible speed (as with speed profiles 70a-70c). The docking mode could occur automatically as an object neared device 20, or a person could separately initiate the docking mode in any suitable manner, such as by pressing a button, or otherwise manipulating a control on device 20, such as a control located on a control panel near handles 40. In one embodiment, the docking mode could be entered any time after an object is detected by proximity sensors 60. Upon entering the docking mode, device 20 would automatically drive itself until it stopped precisely at the detected object, or at a particular distance therefrom. In some embodiments, this automatic driving could take place even if the person removes their hand or hands from either or both of handle sensors 52. Thus, if a person wanted to move a patient handling device 20 such that foot end 48 was positioned precisely against a wall, for example, the person could steer the device 20 until sensors 60 detected the wall, (at which point a light might flash on a control panel), and then activate whatever control or controls were necessary to enter the docking mode. Once entered, the user could relinquish his or her hands from the device 20 and it would automatically continue to move forward following its selected speed profile until it stopped adjacent the wall. The docking mode thus acts as a sort of automatic parking feature for the device 20, enabling personnel to easily position device 20 at desired distances relative to objects. The desired distances may be variable and enterable by the user via a suitable control panel on device 20.

Patient handling device 20 may be configured, in some embodiments, to detect the absolute speed of object 64 relative to the ground, or the absolute speed of device 20 relative to the ground. Controller 58 may use either or both of these absolute speed measurements in carrying out its automatic speed control. In one embodiment, controller 58 may use either or both of these absolute speed measurements to alter the speed profile 70 which it follows, or to select a different speed profile. The alteration of the speed profile 70, or the selection of a new speed profile 70, may be undertaken in order to account for the kinetic energy in device 20 that may otherwise be obscured when relying solely upon relative speed measurements. In other words, controller 58 may impose more severe speed limits in situations where it has a higher kinetic energy but the same relative velocity to an object. For example, if the relative velocity between a stationary object 64 and device 20 is 4 miles per hour, controller 58 may restrict the speed of device 20 to a greater extent than it would in the situation where a four mile per hour relative velocity was present but object 64 had an absolute velocity toward device 20. For example, suppose the object had an absolute speed of 2 mph toward device 20 mph and the device 20 had an absolute speed of 2 mph toward the object (thus resulting in a 4 mile per hour relative velocity). In such a situation, controller 58 may allow a higher absolute speed limit for device 20 because there is less kinetic energy in device 20 to eliminate or reduce than in the situation where object 64 was stationary.

Figure 11:
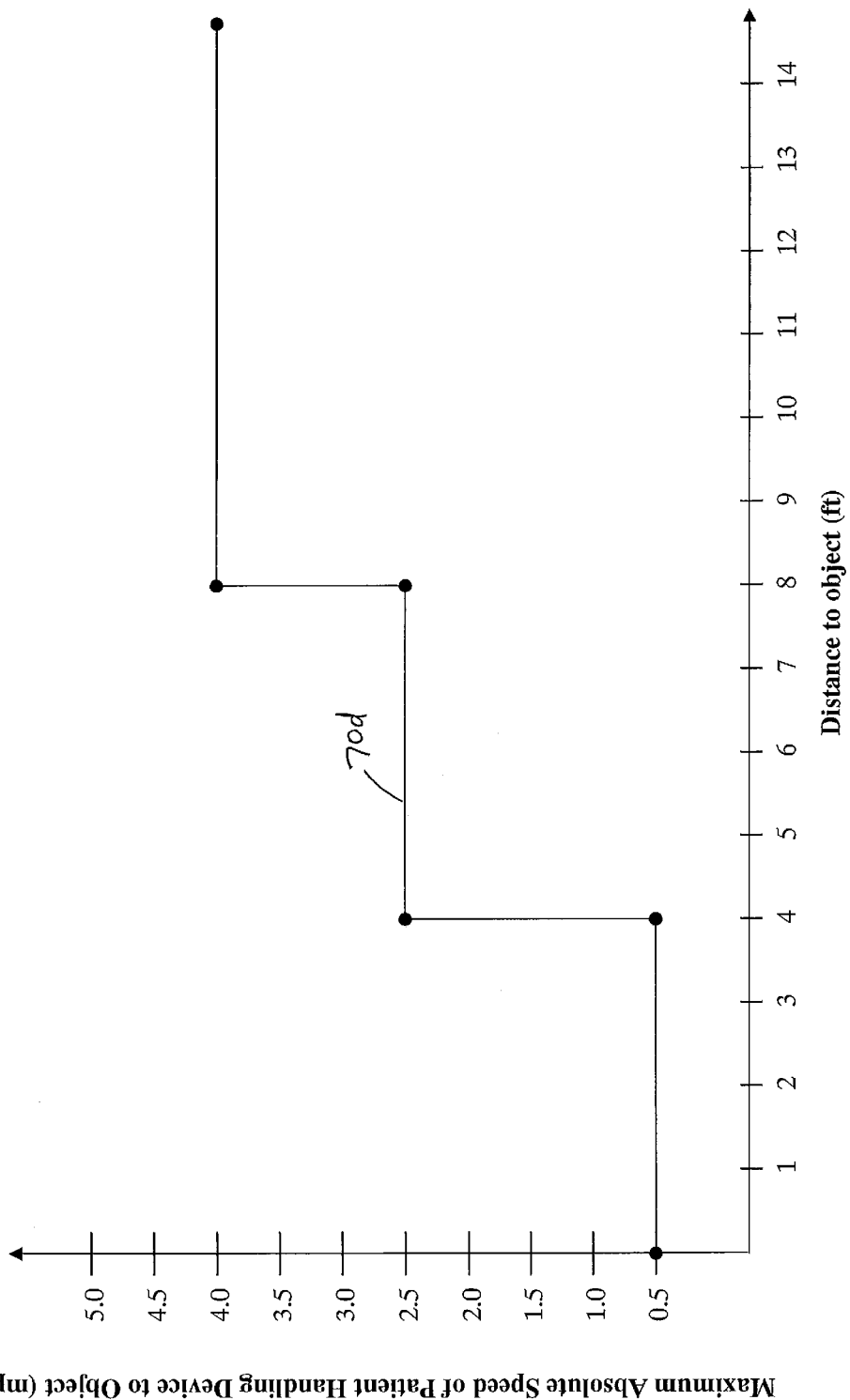
FIG. 11 is another chart illustrating another speed profile that may be followed in some embodiments by the patient handling device.

In addition to the speed profiles 70a-c illustrated in FIGS. 9-10, which correlate a maximum relative speed to a measured distance, speed profiles that map other variables may also be used. For example, FIG. 11 illustrates a speed profile 70d that maps measured object distances directly to an absolute maximum speed of device 20, rather than a relative maximum speed as in speed profiles 70a-c. Thus, in the example of FIG. 11, controller 58 will direct device 20 to move at a speed of 2.5 miles per hour anytime an object is detected within 4-9 feet of sensor 60, regardless of whether the object is stationary or mobile. In still other speed profiles, controller 58 may map measured relative speeds between device 20 and object 64 to maximum absolute speeds for device 20. In still other embodiments, speed profile 70 may map still other parameters in other ways.

Proximity sensor(s) 60 may also be configured, in some embodiments, to detect a lateral distance LD of objects 64 from a longitudinal centerline 78 of device 20, in addition to their distance D in front of device 20 (FIG. 7). Controller 58 may use the lateral distance LD in determining how to control the speed of the one or more motors 44. That is, the speed profiles illustrated in FIGS. 9-11, which are functions of distance, may be modified to be functions of lateral distance LD in addition to the total distance D. The manner in which controller 58 may factor into account the lateral distance values may vary widely, but generally may involve lower maximum speed limits the closer a detected object 64 is to the centerline 78. The theory behind such reduced speed limits is that objects directly in front of device 20 (i.e. those on or close to centerline 78) may be more difficult to steer around than those further away from centerline 78. The maximum speed of device 20 therefore may be curtailed in a greater fashion the closer the object is to centerline 78.

In addition to detecting the lateral distance LD of objects 64, patient handling device 20 may be configured, in some embodiments, to also detect a lateral speed of objects 64. The lateral speed of objects 64 refers to the speed of the objects 64 in a direction perpendicular to centerline 78. When patient handling device 20 detects the lateral speed of objects 64, controller 58 may be configured to first determine if the lateral speed of the object 64 is sufficient, assuming no changes are made to the lateral speed, to cause the object to move out of proximity 68 prior to the arrival of patient handling device 20 at the location of the object. If controller 58 determines that the lateral speed of the object is such that it will exit vicinity 68 prior to device 20's arrival, then controller 58 will not implement any speed limit based upon the detection of that object, even if the object is at a distance D that would otherwise cause a speed limit to be imposed were the object stationary. In other words, controller 58 may be configured to react to objects 64 with lateral speeds differently than objects 64 that have no lateral speeds. Such different reactions would allow a person to walk briefly across the forward path of device 20 without affecting the speed of device 20 provided the person walked with a lateral speed sufficient to bring them out of the direct path of device 20 prior to the arrival of device 20 at the person's location.

Patient handling device 20 is configured such that if it detects multiple objects, it will react to the object that presents the greatest threat of a collision. For example, if sensors 60 detect a first stationary object at a distance of four feet and a second stationary object at a distance of eight feet, and if controller 58 is following the speed profile 70a of FIG. 9, controller 58 will institute a speed limit of 1.5 miles per hour, which is the speed limit set by profile 70a for a distance of four feet. The manner in which sensors 60 discern multiple objects from a single object may take on any of various conventional manners used in other arts, such as radar sensing and other position sensing equipment utilizing reflected waves, as would be known to one skilled in the art.

In carrying out any of the various embodiments discussed herein, controller 58 may utilize one or more brakes 80 (FIG. 7), if necessary, to carry out the appropriate speed controls. That is, in sonic instances, merely reducing power to motor 44 may not cause device 20 to slow down, such as when traveling down an incline or when using a motor with freewheeling characteristics. Or, in other instances, merely reducing power to motor 44 may not cause device 20 to slow down fast enough. In any of these situations, as well as in other situations, controller 58 may apply one or more brakes 80 to reduce the speed a desired amount. The brakes that may be applied by controller 58 may be brakes for the one or more drive wheels 46, or they may include brakes for the one or more castered wheels 36 that may be present on device 20. Regardless of whether controller 58 activates brakes 80 on drive wheels 46 or castered wheels 36, or both, controller 58 specifies the degree of braking that should be applied. In other words, controller 58 is able to generate intermediate amounts of braking that are less than the full braking force that may be applied by brakes 80. This ability to supply intermediate braking levels allows for smoother control of device 20 than would otherwise be possible. The application of the brakes may also be triggered at certain threshold distances to objects whereby if the object gets within a specified threshold distance, controller 58 applies the brakes.

In still other embodiments, controller 58 may be in communication with a battery level sensor 82 and/or a power plug sensor 84. Battery level sensor 82 measures an amount of electrical power that remains in a battery 86 positioned on board device 20 that provides the electrical power to motor 44. Controller 58 may provide a visual indication to users of device 20 via one or more control panels, or other displays, of the amount of power remaining in battery 86. Controller 58 may also prevent the powered movement of device 20 via handle sensors 52 and motor 44 if the power level in battery 86 falls to too low of a level. Battery 86 is typically a rechargeable battery that is capable of being recharged through an electrical cable on-board device 20 that plugs into an electrical wall outlet when device 20 is not being moved. In order to prevent device 20 from being moved via motor 44 while this cord is still plugged into a wall outlet, power plug sensor 84 detects when the cord is plugged into a wall outlet and sends a signal to controller 58 of that fact. Controller 58 reacts to this by ignoring any motion commands that may be sensed by handle sensors 52 and by displaying a visual warning that indicates that the power cord must first be unplugged before motor 44 can be activated. Controller 58 and power plug sensor 84 thereby act to help prevent the power cord from being inadvertently torn from the electrical wall outlet.

In some embodiments, patient handling device 20 may be configured to limit its speed even if a motor 44 is not supplied on device 20. That is, some patient handling devices 20 may not necessarily be equipped with motors for assisting the movement of the device 20, but instead rely upon an individual manually pushing on device 20 to move it. Such embodiments may include one or more castered wheels that enable the individual to wheel the device 20 to its intended location. In such embodiments, controller 58 acts to limit the speed based upon objects detected by proximity sensors 60 in order to reduce the likelihood of collision with those objects. Controller 58 accomplishes this speed control through the selective application of one or more brakes 80 positioned on device 20. Controller 58 may use any suitable type of speed profile in carrying out its collision avoidance, although the speed profiles for manually powered devices 20 will typically have a transition point 74 at a smaller distance D than a motor-powered device 20. The use of speed profiles on manually powered devices 20 can be particularly useful in situations where it may be difficult for an individual to manually stop the device 20, such as when traveling down ramps or in other situations.

As was noted above, proximity sensors 60 in the various embodiments discussed herein may utilize ultrasonic, electromagnetic, inductive, capacitive, photoelectric, machine vision, or capacitive sensing technologies. When implemented as a mechanical sensor, proximity sensors 60 may include a physical structure that extends forward from device 20 and senses contact with objects in the path of device 20. The physical structure may be constructed of a highly flexible material that allows the structure to flex upon contact with the object so that the physical structure does not itself cause a jarring collision with the object detected.

Additional modifications can be made to all of the different embodiments of patient handling device 20 discussed herein. Some of these additional modifications include the repositioning of proximity sensors 60 at head end 42 of device 20 and the repositioning of handles 40 and handle sensors 52 at foot end 48 of device 20. Such repositioning would allow the device to be pushed from the foot end 48, rather than the head end 42. Still further, device 20 could be modified to include handles 40, handle sensors 52, and proximity sensors 60 on both head and foot ends 42 and 48, thereby allowing a person to push the device 20 from either end while still maintaining the collision avoidance features. In still other embodiments, the one or more drive wheels 46 may be vertically movable between an extended position in which they contact the floor and a retracted position in which they disengage the floor. This retraction of the drive wheels may facilitate sideways movement and/or turning of the device 20, which may be desirable in certain situations, such as when the device 20 is being finally positioned in a particular room or other area. Some embodiments of patient handling device 20, such as that illustrated in FIG. 1, may include one or more siderails 90 that are movable between raised and lowered positions.

It should further be understood that, although the bulk of the discussion above has focused on automatically reducing the speed of device 20 in order to match the selected speed profile 70, controller 58 may also automatically accelerate device 20 in certain situations in order to match the speed profile 70. Such automatic acceleration may occur when a detected mobile object 64 accelerates away from device 20, thereby causing at least a temporary decrease in the relative velocity between the device 20 and the mobile object 64. If the device 20 was traveling at a speed less than the permitted maximum of the speed profile 70 at the moment of the object's acceleration, controller 58 may automatically accelerate device 20 (even without any pressure or force changes made to power assist control 53). Thus, as but one example, if a user were pushing on (or otherwise activating) power assist control 53 at a constant force or pressure and device 20 automatically slowed down due to the proximity of a person, the speed of device 20 might automatically increase back to its original speed if the person moved out of the way of device 20, or if the person accelerated in the same direction as the movement of device 20.

It will be understood that the embodiments shown in the drawings and described above are merely for illustrative purposes, and are not intended to limit the scope of the invention which is defined by the claims which follow as interpreted under the principles of patent law including the doctrine of equivalents.

What is claimed is:

1. A patient handling device comprising:
    a frame;
    a patient support surface adapted to at least partially support a weight of a patient positioned on said patient handling device, said patient support surface supported by said frame;
    a plurality of wheels adapted to allow said patient handling device to be rolled to different locations;
    a motor adapted to drive at least one of said wheels;
    a power assist control positioned on said patient handling device, said power assist control adapted to be activated by a person;
    a sensor coupled to said patient handling device adapted to detect objects within a proximity to the patient handling device; and
    a controller in communication with said power assist control, said motor, and said sensor, said controller adapted to drive said motor such that a speed of said patient handling device follows a predetermined speed profile while at least one of the objects continues to be detected and said power assist control continues to be activated, said predetermined speed profile defining a plurality of acceptable speeds for a range of distances between said patient handling device and the at least one object.

2. The device of claim 1 wherein said predetermined profile correlates a distance of the object to a relative speed of the device and said profile includes only non-zero speeds.

3. The device of claim 2 wherein said speed profile indicates slowing down the speed of the motor at a rate that increases with increasing closeness of the object to the sensor.

4. The device of claim 1 wherein said speed profile indicates accelerating said patient handling device if an increase in distance between said patient handling device and the object is detected.

5. The device of claim 1 wherein said sensor is positioned at a first end of said patient handling device and said power assist control is positioned at a second end of said patient handling device, said second end opposite said first end.

6. The device of claim 1 further including a speed sensor adapted to detect an absolute speed of said patient handling device, said speed sensor in communication with said controller, and said controller further adapted to control a speed of said motor in a manner that takes into account the absolute speed of said patient handling device.

7. The device of claim 1 wherein said patient handling device is one of a bed and stretcher, and said patient handling device further includes:
    a first siderail positioned on a first side of said frame;
    a second siderail positioned on a second side of said frame, said second side opposite said first side; and
    a lifting device adapted to raise and lower said patient support surface.

8. The device of claim 7 wherein said plurality of wheels include four castered wheels and at least one non-castered wheel, said non-castered wheel adapted to be driven by said motor.

9. The device of claim 1 wherein said controller is adapted to drive said motor, when no object is detected by said sensor at a speed based upon an amount of force exerted by a person on said power assist control.

10. The device of claim 1 further including a brake in communication with said controller wherein said controller is further adapted to activate said brake in order to follow said speed profile.

11. The device of claim 1 wherein said patient handling device includes weight sensors adapted to detect a weight of a patient supported on said patient support surface and said controller is adapted to control a speed of said motor when an object is detected in a way that is based upon said detected weight.

12. The device of claim 1 wherein said sensor is configured to detect multiple objects and said controller is adapted to select one of said multiple objects and use at least one characteristic about the selected object in controlling said motor.

13. The device of claim 12 wherein said controller is adapted to select the one of said multiple objects that is likely to impact the patient handling device the soonest, said selection being based at least upon the speed of the multiple objects and the respective distances of the multiple objects to the patient handling device.

14. The device of claim 4 wherein said controller allows said motor to continue driving said at least one wheel at at least a nominal speed no matter how close the object gets to said patient handling device, so long as said power assist control remains activated.

15. A patient handling device comprising:
a frame;
a patient support surface adapted to at least partially support a weight of a patient positioned on said patient handling device, said patient support surface supported by said frame;
a plurality of wheels adapted to allow said patient handling device to be rolled to different locations;
a motor adapted to drive at least one of said wheels;
a power assist control positioned adjacent a first end of said frame, said power assist control adapted to be activated by a person;
a sensor coupled to said patient handling device and adapted to detect objects within a proximity to the patient handling device; and
a controller in communication with said power assist control, said motor, and said sensor, said controller adapted to drive said motor in a manner based upon a relative velocity between said patient handling device and an object detected by said sensor.

16. The device of claim 15 wherein said controller drives said motor according to a predetermined speed profile that correlates a distance of the object to a relative speed between the object and said patient handling device.

17. The device of claim 16 wherein said profile includes only non-zero speeds.

18. A patient handling device comprising:
a frame;
a patient support surface adapted to at least partially support a weight of a patient positioned on said patient handling device, said patient support surface supported by said frame;
a plurality of wheels adapted to allow said patient handling device to be rolled to different locations;
a motor adapted to drive at least one of said wheels;
a power assist control positioned adjacent a first end of said frame, said power assist control adapted to be activated by a person;
a sensor coupled to said patient handling device and adapted to detect objects within a proximity to the patient handling device; and
a controller in communication with said power assist control, said motor, and said sensor, said controller adapted to: (1) drive said motor in a manner to cause said patient handling device to move forward when a person activates said power assist control, (2) monitor said sensor to determine if an object is detected by said sensor, and (3) if an object is detected by said sensor, determine a distance from said patient handling device to said object and automatically adjust the motor in such a manner that said patient handling device will reduce its speed, but not completely stop, even if the object continues to get nearer to said patient handling device and the person continues activating said power assist control.

19. The device of claim 18 wherein said controller is further adapted to determine if said object is moving and, if so, determine a direction of movement of said object and use the direction of movement information to control said motor.

20. The device of claim 18 wherein said controller is further adapted to determine if multiple objects have been detected by said sensor and, if multiple objects have been detected, control said motor in a manner intended to avoid collision with any of said multiple objects.

21. A patient handling device comprising:
a frame;
a patient support surface adapted to at least partially support a weight of a patient positioned on said patient handling device, said patient support surface supported by said frame;
a plurality of wheels adapted to allow said patient handling device to be rolled to different locations;
a motor adapted to drive at least one of said wheels;
a power assist control positioned adjacent a first end of said frame, said power assist control adapted to be activated by a person;
a sensor coupled to said patient handling device and adapted to detect objects within a proximity to the patient handling device; and
a controller in communication with said power assist control, said motor, and said sensor, said controller adapted to: (1) drive said motor in a manner to cause said patient handling device to move forward when a person pushes on said power assist control, (2) monitor said sensor to determine if an object is detected by said sensor, and (3) if an object is detected by said sensor, automatically control an absolute speed of said patient handling device so as to not exceed a predetermined speed profile.

22. The device of claim 21 wherein said controller is further adapted to automatically apply a brake on the patient handling device, as necessary, in order to not exceed said predetermined speed profile.

23. The device of claim 21 wherein said controller is further adapted to automatically accelerate said patient handling device if the detected distance between the object and the patient handling device increases.

24. The device of claim 21 wherein said predetermined speed profile maps object distances to acceptable speeds between said patient handling device and the object.

25. The device of claim 1 wherein said patient handling device is a bed or a stretcher, and said power assist control includes at least one handle positioned at an end of said patient handling device.

26. The device of claim 15 wherein said patient handling device is a bed or a stretcher, and said power assist control includes at least one handle positioned at an end of said patient handling device.

27. The device of claim 18 wherein said patient handling device is a bed or a stretcher, and said power assist control includes at least one handle positioned at an end of said patient handling device.

28. The device of claim 21 wherein said patient handling device is a bed or a stretcher, and said power assist control includes at least one handle positioned at an end of said patient handling device.

* * * * *